United States Patent
Yokel et al.

(10) Patent No.: US 10,715,670 B2
(45) Date of Patent: Jul. 14, 2020

(54) PREDICTIVE SERVICE FOR SMART ROUTING

(71) Applicant: T-Mobile USA, Inc., Bellevue, WA (US)

(72) Inventors: Ryan Yokel, Seattle, WA (US); Rudy Bourcelot, Everett, WA (US); James Ellison, Issaquah, WA (US); Joel Werdell, Seattle, WA (US); Robert Stamm, Smmamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/194,180

(22) Filed: Nov. 16, 2018

(65) Prior Publication Data

US 2020/0162614 A1    May 21, 2020

(51) Int. Cl.
*H04M 3/00* (2006.01)
*H04M 3/523* (2006.01)
*H04L 29/06* (2006.01)
*H04W 8/18* (2009.01)
*H04M 3/54* (2006.01)
*H04W 4/16* (2009.01)

(52) U.S. Cl.
CPC ...... *H04M 3/5233* (2013.01); *H04L 65/1069* (2013.01); *H04M 3/541* (2013.01); *H04M 3/546* (2013.01); *H04W 4/16* (2013.01); *H04W 8/18* (2013.01)

(58) Field of Classification Search
CPC .......................... H04M 3/5233; H04L 65/1069
USPC ....... 379/265.01–265.14, 266.01–266.1, 309
See application file for complete search history.

(56) References Cited

U.S. PATENT DOCUMENTS

| | | | | |
|---|---|---|---|---|
| 2002/0194319 A1* | 12/2002 | Ritche | ................ | H04L 41/0631 709/223 |
| 2013/0003563 A1* | 1/2013 | Croak | ................ | H04L 41/0609 370/242 |
| 2013/0346447 A1* | 12/2013 | Wu | ..................... | G06F 16/9535 707/776 |
| 2014/0022328 A1* | 1/2014 | Gechter | ................ | G06Q 30/06 348/14.02 |
| 2016/0044174 A1* | 2/2016 | Tuchman | ........... | G06Q 30/0601 379/265.12 |
| 2017/0316438 A1* | 11/2017 | Konig | ............... | G06Q 30/0204 |

* cited by examiner

*Primary Examiner* — William J Deane, Jr.
(74) *Attorney, Agent, or Firm* — Han Santos, PLLC (57) ABSTRACT

Techniques for identifying a likely subject of a user contact with a user support network and routing the user contact to an agent or an application that is determined to have relevant experience with the subject or issue the user is experiencing. To identify a likely subject of the user contact, data is gathered from a user device as well as from secondary user devices located near the user device. Also, data related to network resources the user device is using, history data of a user's previous contacts with the user support network, and account data associated with the user device is also collected. As a result, the user contact is routed to a knowledgeable agent who is likely to resolve the user's issue without further routing or consultation, thus saving network bandwidth, user device resources, agent time, user time, etc.

20 Claims, 6 Drawing Sheets

PREDICTIVE SERVICE FOR SMART ROUTING

BACKGROUND

Enterprises that sell products to users usually maintain user support services so that users continue to use the products manufactured by the enterprises. Quality user support services typically aim to achieve one or more of several goals, most or all of which operate to reduce the time it takes for a user to resolve any issues they are experiencing. Enterprises that include a distributed network of devices can leverage information obtained from the devices to help achieve user support services goals.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Overview

Techniques for reducing a time required to resolve user issues with electronic devices and the services attendant thereto are disclosed herein. In particular, the present discussion relates to a cellular network that facilitates communications for a large number of cellular devices in different locations. In addition to technical aspects of such a network, there are also non-technical aspects—such as billing, collections, financing, etc.—that are also supported.

Key features of the techniques described herein allow a cellular service provider to predict a subject of a user's contact with user support services and to route the user contact to a user support group or agent that is most able to handle the subject matter of the contact. Generally, when a user contacts user support services, a cellular service provider has access to a great amount of data related to multiple cellular network devices, including technical data regarding the user's device, technical data regarding the network location the user is utilizing, technical data from cellular devices other than the user's, the user's account information, the user's history with user support services, etc.

To assess particular skills of a user support agent, data is collected from each user contact, such as the subject matter, whether the issue was technical or non-technical, what type of user device was involved, whether the issue was resolved, etc. User surveys completed after an interaction with an agent may also be used to further assess an agent's particular skills. Such data is maintained in a database so that the parameters of a particular problem can be matched with similar parameters of user support contacts that agents have successfully handled.

Figure 1:
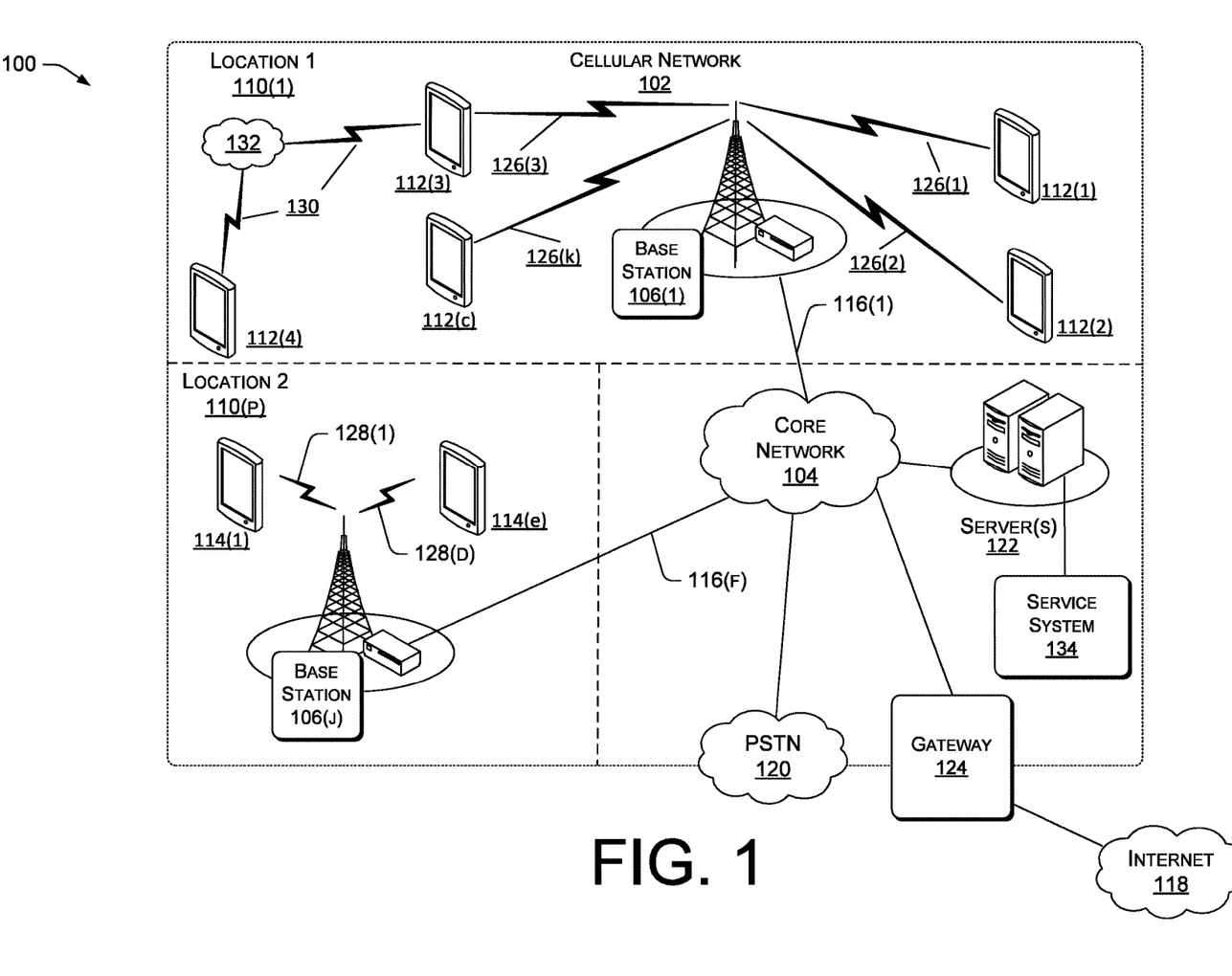
FIG. 1 is a diagram of an example cellular network that implements a user support services system with a predictive service as described herein.

One technical feature in a cellular network that can be taken advantage of is that certain data can be collected from each cellular device connected to the network. This is a de facto distributed network of sensors, and the distributed nature of the sensors can be leveraged in certain circumstances to anticipate or identify a likely issue arising in a particular cellular device. For example, if a problem can be identified in a first cellular device, other cellular devices can be sampled to see if they are experiencing a similar problem. If so, then the problem may be rooted in a network problem in a network location that all the cellular devices are utilizing. If they are not experiencing a similar problem, then the problem may be isolated on the first cellular device.338 Example User Support Services System FIG. 1 illustrates an example cellular network architecture 100 for implementing the technology described herein. The network architecture 100 includes a cellular network 102 that is provided by a wireless telecommunication carrier. The cellular network 102 includes a core network 104 and cellular network base stations 106(1)-106(j), each of which includes a transmission tower. Each base station 106(1)-106(j) are located in different geographical locations. Base station 106(1) are located in "Location 1" 110(1), and base station 106(j) are located in "Location n" 110(p). Although only two base stations 106 and corresponding transmission towers are shown in this example, the cellular network 102 may comprise any number of base stations, hence the reference to "n" in certain reference numerals. The cellular network 102 provides telecommunication and data communication in accordance with one or more technical standards, such as Enhanced Data Rates for GSM Evolution (EDGE), Wideband Code Division Multiple Access (W-CDMA), HSPA, LTE, LTE-Advanced, CDMA-2000 (Code Division Multiple Access 2000), and/or so forth.

The base stations 106(1)-106(j) are responsible for handling voice and data traffic between multiple user devices (such as user devices 112(1)-112(c), and 114(1)-114(e), respectively) and the core network 104. Each user device 112, 114 communicates with a base station 106 in a location of each user device 112, 114. In particular, user devices 112(1)-112(c) communicate with base station 106(1), and user devices 114(1)-114(e) communicate with base station 106(j). Each of the base stations 106(1)-106(j) are communicatively connected to the core network 104 via a corresponding backhaul 116(1)-116(f). Each of the backhauls 116(1)-116(f) are implemented using copper cables, fiber optic cables, microwave radio transceivers, and/or the like.

The core network 104 also provides telecommunication and data communication services to the user devices 112 and 114. In the present example, the core network connects the user devices 112 and 114 to other telecommunication and data communication networks, such as the Internet 118 and a public switched telephone network (PSTN) 120. The core network 104 includes one or more servers 122 that implement network components, store data, implement applications, etc. For example, the network components may include a serving GPRS support node (not shown) that routes voice calls to and from the PSTN 120, a Gateway GPRS Support Node (not shown) that handles the routing of data communication between external packet switched networks and the core network 104. The network components may further include a Packet Data Network (PDN) gateway (PGW) 124 that routes data traffic between the GGSN and the Internet 118.

Each of the user devices 112, 114 is an electronic communication device, including but not limited to, a smartphone, a tablet computer, a portable personal computer, an embedded computer system, etc. Any electronic device that is capable of using the wireless communication services that are provided by the cellular network 102 may be communicatively linked to the cellular network 102. For example, a user may use an electronic cellular device 112 to make voice calls, send and receive text messages, and download content from the Internet 118. User devices 112, 114 are communicatively connected to the core network 104 via a base station 106. Accordingly, communication traffic between user devices 112(1)-112(c) and the core network 104 are handled, respectfully, by wireless interfaces 126(1)-126(k) that connect the user devices 112(1)-112(c) to base station 106(1)-106(j). Similarly, communication traffic between user devices 114(1)-114(e) and the core network 104 are handled by wireless interfaces 128(1)-128(d) that connect the user devices 114 to base station 106(j). In some cases, a user device (such as user devices 112(3) and 112(4)) will communicate with a base station 106 by way of a wireless interface 130 to a local network 132, such as a hot spot network set up by another user device 112, a private wireless network, a public access wireless network, or the like.

The cellular network 102 is capable of monitoring characteristics of communications that pass through the cellular network 102 from user devices 112, 114, the Internet 118, the PSTN 120, or from any other source. Descriptions of such characteristics are stored in the servers 122 and is commonly referred to as metadata. In the present example, such metadata are stored in call data records used by a service 134. As described in greater detail, below, the service 134 stores information related to user support communications from all network users via user devices 112, 114 and can include, without limitation, the user's support history data, a user's device data, a user's account data, network data, and/or the like.

Example User Support Network

Figure 2:
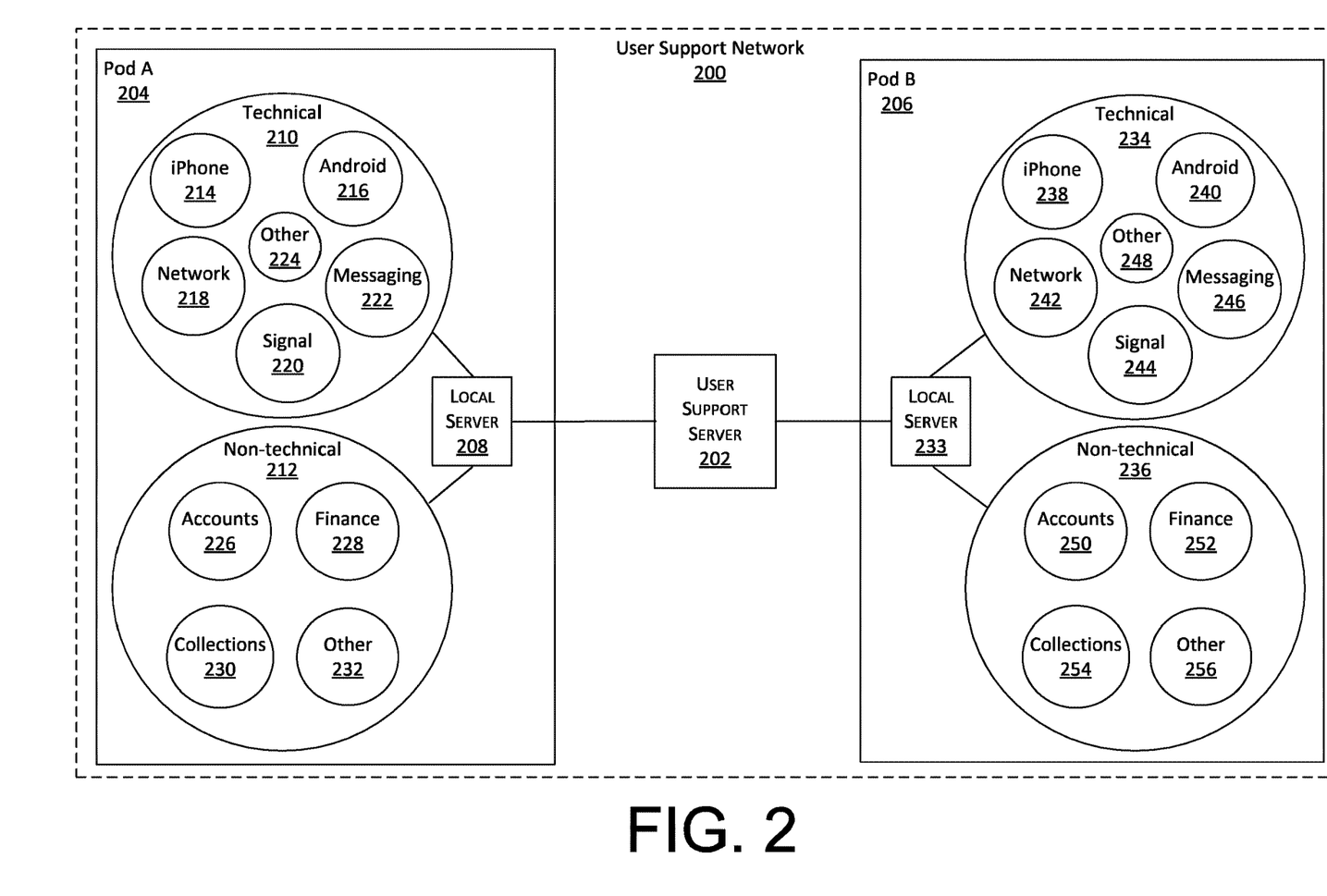
FIG. 2 is a diagram of an example user support network context in which the predictive technological solutions described herein may be implemented.

FIG. 2 is a block diagram of an example user support network 200 in accordance with the predictive service technologies described herein. The user support network 200 includes at least one user support server 202, which is similar to the server(s) 122 shown in FIG. 1. The user support network 200 also includes a first pod 204 (Pod "A") and a second pod 206 (Pod "B"). A pod is a group of user support agents that are responsible for user support contacts in at least one geographic area. The user support agents in a pod may be co-located or they may be geographically dispersed. In the present description of at least one implementation, an area covered by a pod is an area serviced by one base station. However, a pod may service an area that is serviced by multiple base stations. In the following discussion, reference is made to a user device "hitting a tower," which refers to a user device and a transmission tower through which cellular service to the user device is provided. Therefore, for example, reference made to "devices hitting a tower" refers to all cellular devices in communication with a particular base station.

Pod A 204 includes local communication services 208 that support electronic devices, such as one or more wireless network interfaces, one or more hard-wired interfaces (such as Ethernet), an interface with a Local Area Network (LAN), a Wide Access Network (WAN), or the like. The local communication services 208 also includes one or more types of communication modalities, such as a telephone network system, a system of wireless telephones, a text-based communication system, and/or the like. Pod A 204 also includes a group of technical support agents 210 that are trained to handle user support issues of a technical nature. Basically, if a user device is malfunctioning, the technical support agents 210 have the education and skill to resolve the technical issue for the user. Pod A 204 also includes a group of non-technical support agents 212 that are trained to handle user support issues of a non-technical nature, such as account-related or business-related issues, for which they are trained to resolve.

In addition to having general technical skills, the technical support agents 210 of Pod A 204 also have particular skills related to specific technological fields or devices. In the present example, the technical support agents 210 include technical support agents 210 who have specific experience and/or skills related to issues arising with iPhones® 214, Android® devices 216, networks 218, signals 220, and/or messaging 222. Technical support agents 210 may also have other particular skills 224, or particular knowledge of all or multiple technical subject matter.

The non-technical support agents 212 may also have skills specific to particular subject matter. In the present example, there are non-technical support agents 212 with particular skills in user accounts 226, financing 228, and collections 230. Non-technical support agents 212 may also have other particular non-technical skills 232, or may simply have general knowledge of all or multiple necessary non-technical subject matter.

Likewise, Pod B 206 includes local communications services 233 (similar to local communications services 208 of Pod A 204), technical support agents 234, and non-technical support agents 236. The technical support agents 234 also have identifiable skills with particular technical subject matter, such as iPhones 238, Android phones 240, networks 242, signals 244, messaging systems 246, and other subjects 248. The non-technical support agents 236 have identifiable non-technical skills, such as skills related to account matters 250, finance 252, collections 254, and/or other business or non-business issues 256.

Example Server

Figure 3:
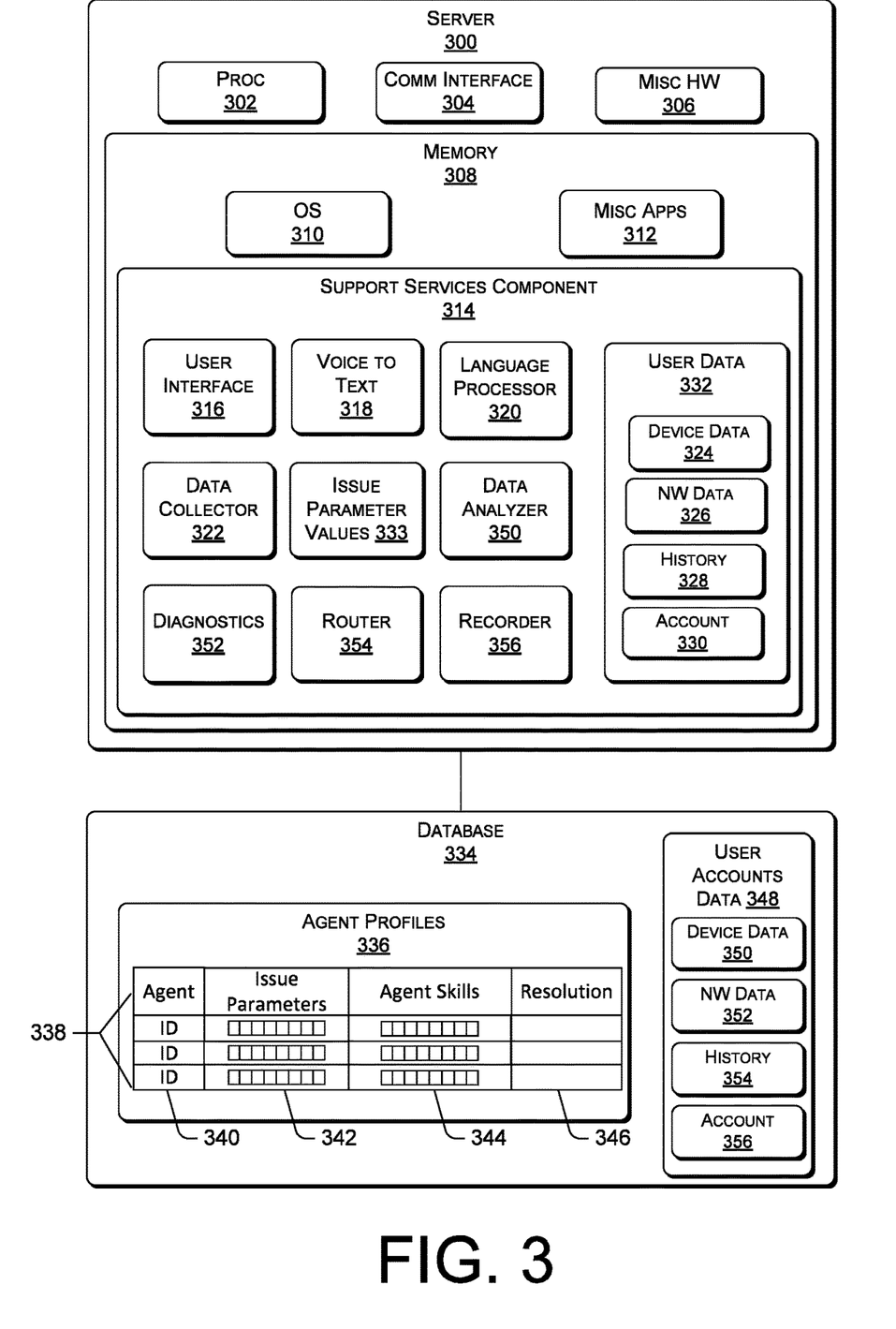
FIG. 3 is a block diagram of an example server in accordance with the technologies described herein.

FIG. 3 is a block diagram of an example server 300 in accordance with the technologies described herein. The one or more servers 122 shown in FIG. 1 are examples of the example server 300 in an operating environment, in particular, the user support network 200 (FIG. 2). In the following discussion, continuing reference is made to previous figures, including elements and reference numbers included therein.

Also, in the following discussion, certain interactions may be attributed to particular components. It is noted that in at least one alternative implementation not particularly described herein, other component interactions and communications may be provided. The following discussion of FIG. 3 merely represents a subset of all possible implementations. Furthermore, although other implementations may differ, one or more elements of the example server 300 are described as a software application that includes, and has components that include, code segments of processor-executable instructions. As such, certain properties attributed to a particular component in the present description, may be performed by one or more other components in an alternate implementation. An alternate attribution of properties, or functions, within the example server 300 is not intended to limit the scope of the techniques described herein or the claims appended hereto.

The example server 300 includes one or more processors 302, one or more communication interfaces 304, and miscellaneous hardware 306. Each of the one or more processors 302 may be a single-core processor or a multi-core processor. The communication interface 304 facilitates communication with components located outside the example server 300 and provides networking capabilities for the example server 300. For example, the example server 300, by way of the communications interface 304, may exchange data with other electronic devices (e.g., laptops, computers, other servers, etc.) via one or more networks, such as the Internet. Communications between the example server 300 and other electronic devices may utilize any sort of communication protocol known in the art for sending and receiving data and/or voice communications.

The miscellaneous hardware 306 includes hardware components and associated software and/or or firmware used to carry out device operations. Included in the miscellaneous hardware 306 are one or more user interface hardware components not shown individually—such as a keyboard, a mouse, a display, a microphone, a camera, and/or the like— that support user interaction with the example server 300.

The example server 300 also includes memory 308 that stores data, executable instructions, modules, components, data structures, etc. The memory 308 can be implemented using computer readable media. Computer-readable media includes at least two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Computer storage media may also be referred to as "non-transitory" media. Although, in theory, all storage media are transitory, the term "non-transitory" is used to contrast storage media from communication media, and refers to a component that can store computer-executable programs, applications, and instructions, for more than a few seconds. In contrast, communication media may embody computer readable instructions, data structures, program modules, or other data in a modulated data signal, such as a carrier wave, or other transmission mechanism. Communication media may also be referred to as "transitory" media, in which electronic data may only be stored for a brief amount of time, typically under one second.

An operating system 310 is stored in the memory 308 of the example server 300. The operating system 310 controls functionality of the processor 302, the communications interface 304, and the miscellaneous hardware 306. Furthermore, the operating system 310 includes components that enable the example server 300 to receive and transmit data via various inputs (e.g., user controls, network interfaces, and/or memory devices), as well as process data using the processor 302 to generate output. The operating system 310 can include a presentation component that controls presentation of output (e.g., display the data on an electronic display, store the data in memory, transmit the data to another electronic device, etc.). Additionally, the operating system 310 can include other components that perform various additional functions generally associated with a typical operating system. The memory 308 also stores miscellaneous software applications 312, or programs, that provide or support functionality for the example server 300, or provide a general or specialized device user function that may or may not be related to the example server 300 per se. The software applications 312 include system software applications and executable applications that carry out non-system functions.

The memory 308 also stores a support services component 314 that is similar to a support services component stored on the server(s) 122 shown in FIG. 1. The support services component 314 performs and/or controls operations to carry out the techniques presented herein and includes several elements that work together to provide improved systems and tools for smart routing of communications services.

The support services component 314 includes a user interface (UI) 316 that is configured to provide a user contact when a user calls or messages the server 300 (via communications interface 304) with regard to a user support issue, such as a cellular device malfunction, a question regarding a cellular device, a question regarding a user account, etc. Information input to the support services component 314 may include any notice of contact by a user, including a voice message, a text message (email, SMS, etc.), or simply an identifier associated with the user's cellular device, such as a caller identification (i.e., a phone number of the cellular device). If the information is a voice message, then the voice message is output to a voice-to-text converter 318, which converts the voice message to a text message. Thereafter, the text message output from the voice-to-text converter 318 is sent to a parser 320, which identifies pre-defined keywords in the text message. If the information input via the user interface 316 is originally a text-based communication, then the voice-to-text converter 318 can be skipped and the text can be sent from the user interface 316 directly to the parser 320, which identifies pre-defined keywords.

The support services component 314 also includes a data collector 322. The data collector receives input from the parser 320, the input including at least key words identified in the message. Identified key words can indicate a subject of the user's issue, such as if the user message contains words such as "signal," "no signal," "dropped calls," "no messaging," etc. Together with identified keywords, the data collector 322 also receives a device identifier from the user interface 316. As previously noted, the device identifier can be a phone number assigned to the contacting device. The data collector 322 receives the device identifier even if there was not a message included in the contact, and no input is received from the parser 320.

The data collector 322, after having received the device identifier, uses the device identifier to locate additional data related to the contacting device and/or a user of the contacting device. In at least one implementation, the data collector 322 retrieves and stores device data 324, network data 326, history data 328, and account data 330. The collected data is collectively known as user data 332, and may include more, fewer, or other types of data than explicitly recited herein. Certain key parameter values 333 may be extracted from the user data 332 to be used in operations described below.

The device data 324 is device-related data collected from the user's (i.e., primary) device 112(1) (FIG. 1) and at least one other secondary user device (FIG. 1, 112(2) 112(*c*)). In determining how many and which secondary user devices 112(2)-112(*c*) from which data is to be collected, the data collector 322 selects secondary user devices 112(2)-112(*c*)

that are in approximately the same location of the primary device 112(1). "Location," as used herein, means a general area of the primary device 112(1). The determination of the general area can be an area covered by a pre-defined radius from the primary device 112(1), or it can be an area served by a base station 106(1) with which the primary device 112(1) is in communication. The area served by a base station 106(1) can be composed of all user devices that are in communication with the base station 106(1) with which the primary user device 112(1) is in communication, i.e., all user devices 112(2)-112(c) hitting the same base station 106(1) as the primary user device 112(1)).

Having data from the secondary user devices 112(2)-112(c) provides an advantage of supplying data that can be compared to similar data from the primary user device 112(1). For example, if the primary user device 112(1) cannot send or receive text messages, the secondary user devices 112(2)-112(c) similarly situated to the primary user device 112(1) can be inspected to determine if the problem is isolated with the primary user device 112(1) or is common to one or more secondary user devices 112(2)-112(c). If the problem is only with the primary user device 112(1), then continuing analysis can focus on that device. If, however, secondary user devices 112(2)-112(c) are experiencing the same issues, attention may be focused in a different direction, such as whether there is a network issue in that area. Being able to get data from distributed user devices that are co-located with the primary user device 112(1) is thus important for at least some of the implementations described herein and anticipated therefrom.

The network data 326 retrieved by the data collector 322 is technical and usage data related to a network path to the user device. Network data 326 can therefore relate to a wireless interface 126(1) (FIG. 1) between the primary user device 112(1) a base station 106(1), a backhaul 116(1) between the base station 106(1) and the core network 104, etc.

The support services component 314 also includes a database 334 that includes multiple records 338 (i.e., rows). Each record 338 includes multiple fields 340-346 (i.e., columns), and is associated with an instance of a user issue that was handled by the user support network 200 (FIG. 2). As such, data associated with a current user issue can be compared to previous user issues to find a likely subject of the current user contact. As shown in FIG. 3, the database 334 may also include user account data 348, which is a data store that includes account information on multiple users.

The contents of the multiple fields 340-346 can vary between different implementations, but in the presently described implementation includes a record number field 340, an agent identifier field 342, an issue parameters field 344, and a resolution field 346. The record number field 340 includes an identifier that uniquely identifies the record 338 in the table 336 that includes the record number field 340. The agent identifier field 342 includes an identifier that uniquely identifies an agent who handled an issue associated with a record 338. The issue parameters field 344 can include any number of parameters indicating something that may help to determine a subject of the user contact. In each record 338, the issue parameters field 344 can include device information from a user device and secondary devices collocated with the user device, network data, account-related data, etc. The parameters field 344 also includes a device identifier and/or a user identifier associated with a device to which a record 338 relates. In one or more alternate implementations, a field may be included for a device identifier and/or a user identifier. However, in the implementation described, the table 336 is focused on an agent identifier and, therefore, an agent identifier is shown as a unique field. Generally, any parameter related to a previous support contact from any user may be stored in the database 334.

The history data 328 collected by the data collector 322 includes information retrieved from records 338 that relates to an identified user device and/or an identified user of an identified device. The data collector 322 takes identifying information it received from the user interface 316 and searches the record fields (i.e., the issue parameters field 344 for each record 338) for a match with a user identifier (i.e., user name) or a device identifier (i.e., phone number). The data collector 322 retrieves user account data 348 to store as account data 330. The data collector 322 uses a user identifier and/or a device identifier received from the user interface 316 to locate relevant data in the user account data 348 to store in account data 330. Any information that an implementer decides will be helpful in matching a current issue to a previous issue may be stored in the issue parameters field 344.

The resolution field 346 of the table 336 includes information about whether the issue associated with a record 338 was resolved satisfactorily. If it was, the resolution field 346 can contain data parameters related to the solution—what the agent associated with the issue did, what data was relevant to the decision, etc. If it was not resolved satisfactorily, the resolution field 346 can contain data parameters related to attempted solutions, such as what the agent associated with the issue did, what data was used in the decision-making process, etc. The information contained in the resolution field 346 of the table 336 can help an agent or application handling a current issue understand solutions that were successful in similar issues, or attempted solutions that did not resolve a similar problem. Either way, a shorter process can result from understanding such information.

The support services component 314 also includes a data analyzer 350 and a diagnostics module 352. The data analyzer 350 receives input from the data collector 322, either in data form or by way of links to collected and stored user data 332. The data analyzer 350 includes logic that is able to recognize patterns in the user data 332 and use those patterns to predict a likely outcome when certain events occur. In other words, the data analyzer 350 takes known facts and applies them to a current problem to deduce a probable future. The data analyzer 350 is designed to accomplish at least two things: (1) determine an issue subject about which a user is contacting support services; and (2) determine a best routing for the contact in order to provide the fastest resolution to the issue.

The data analyzer 350 can be implemented to use any of the user data 332 to determine a likely subject of the contact issue. Among the determinations that can be deduced by the data analyzer are:

Whether the contact is related to an issue that can be remediated remotely;
Whether the contact is related to an issue that is (or is not) occurring in other devices located near the user device;
Whether the contact is related to a technical or non-technical issue;
Whether the contact is related to an issue the user has experienced previously;
Whether the contact is related to an issue that has been previously resolved with other users; and
Whether the contact is related to an issue that was previously resolved by a particular agent;

Whether the contact is related to content of previous messaging; etc.

The above examples are merely exemplary, and deductions that can be made by the data analyzer 350 are not limited. Any data that can be collected that is related to a user or a user device may be used to make deductions about a subject for which a user is likely contacting the user support network 200.

Some examples of how the data analyzer 350 can compare data to determine a likely subject are described below. The following examples relate, respectively, to the deductions listed above. The examples provide more clarity as to what data can be collected to make the deductions listed above.

Example A

Whether the contact is related to an issue that can be remediated remotely. The data analyzer 350 can deduce whether a user problem is a device technical problem or a network technical problem. Consider a situation where a user contacts the user support network 200 because the user is unable to send or receive text messages from the user's device. The data analyzer 350 can determine if other devices in the same area are able to send and receive text messages. If so, then the data analyzer 350 can further determine if the user is out of his normal area of operation. If so, then there might be an issue related to the user's change of location. The data analyzer 350 can also determine whether the working devices located nearby are different types of phones. For example, if the user's phone is an Android®-based phone, and the working devices located nearby are iOS®-based phones, then there might be an issue specifically related to the Android® operating system. If nearby devices are also showing a messaging failure, then the issue may be related to network resources common to the user device and the nearby devices. In such a case, network resources may be further inspected by the data analyzer 350.

Example B

Whether the contact is related to a technical or non-technical issue. If the user interface 316 receives a message that is determined to contain keywords "pay," "bill," and "T-Mobile," it may be deduced that the subject matter of the contact is bill payment, which is non-technical. The data analyzer 350 may determine that the appropriate routing for the contact is to non-technical support agents 212 (FIG. 2). Further, the data analyzer 350 may determine that within the non-technical support agents 212, the appropriate routing for the contact is to an user account agent or application. Likewise, if the data analyzer 350 receives keywords such as "signal" and/or "dropped calls," it may be deduced that the subject matter of the contact is a technical issue related to a wireless signal, and the contact should be routed to the technical support agents 234 and, further, to an agent or an application that specializes in signals 244.

Example C

Whether the contact is related to an issue the user has experienced previously. The data analyzer 350 can look at the history data 328 and determine that the user has previously contacted user support services about a particular issue. If so, then it may be likely that the user is making contact again relative to the particular issue. Other of the user data 332 might confirm this initial indication, such as if the previous issue related to a device problem, and device data 324 shows that there is currently a similar problem with the user device.

Example D

Whether the contact is related to an issue that has been previously resolved with other users. The data analyzer 350 may examine device data 324 and find a malfunction that is likely the subject of the contact. The data analyzer 350 may also be configured to examine device data from secondary user devices, i.e., user devices located near the user device, and to examine issue histories related to the secondary devices. If issue parameters from the user device match issue parameters from a history of a secondary device, then the data analyzer 350 may determine that a similar action that resolved the issue with the secondary device should be applied to the user device. It can determine whether a particular agent identified in the history of the secondary device should handle the current user device issue and is available to handle the current issue. Or it can determine if a user support pod remediated the issue with the secondary device and determine that the current issue should be handled by the same pod.

Example E

Whether the contact is related to an issue that was previously resolved by a particular agent. If the data analyzer 350 determines from, for example, that the history data 328 indicates that a particular agent identified in the agent identifier field 342 has resolved previous issues with the user identified from the contact, the data analyzer 350 may determine that a best match for routing the contact is to the same agent, if the agent is available. Getting a user support contact to an agent that is familiar with the user (and vice versa) and previous issues experienced by the user can decrease resolution time and increase user satisfaction with the process.

Example F

Whether the contact is related to content of previous messaging; etc. The data analyzer 350 can look at user data 324, such as history data 328, and determine that the user just received a first billing statement after adding services to his subscription, which would increase the user's bill. In that case, it may be determined that the subject of the contact is likely related to the user's increased billing statement. Accordingly, the data analyzer 350 may determine that the appropriate routing for the contact is to an agent or application that handles billing issues, such as user accounts 226 (FIG. 2).

The examples related above are a mere fraction of the deductions that can be made by the data analyzer 350, and the listing of examples is not meant to limit the range of determinations that can be made by the data analyzer. Any deduction that can be made from the collected data that can be made to determine a likely subject of a user contact can be made by the data analyzer 350. Furthermore, a routing decision for the contact can be made from deductions made by the data analyzer 350.

The diagnostics module 352 contains logic that can be executed to determine an issue with a user device and provide a remote fix to resolve the issue. The diagnostics module 352 can be invoked by the data analyzer 350 to determine if there is a technical issue with a user device, or to resolve a technical issue that has been detected in a user device. Frequently, the diagnostics module 352 will correspond to software and hardware diagnostics located on a user device. The diagnostics module 352 is configured to communicate with the data analyzer 350 to provide a detected problem and/or a proposed resolution. The data analyzer 350 can use this information to determine an appropriate routing for a user contact. The diagnostics module 352 is further configured to automatically perform a remote remediation on a user device, or it may initiate a communication with the user device to inform the user that a possible remediation is available, and request permission of the user to proceed with the remediation.

The support services component 314 also includes a router 354 that is configured to perform routing instructions received from the data analyzer 350. Once the data analyzer 350 has made a determination of the most appropriate routing for the user contact, the data analyzer 350 informs the router 354, which initiates the prescribed routing. The support services component 314 further includes a recorder 356 which is configured to record data related to the contact issue in the table 336 of the database 334, including data in an agent identifier field 342, an issue parameters field 344, and a suggested resolutions field 346. When the contact is routed (or a remote fix is performed), a confirmation message is sent to the user, and further information about the resolution may be recorded in the resolution field 346.

Further details of the described technologies and implementations are described below, with reference to subsequent figures that describe methodological implementations of the systems and methods shown and described with respect to FIGS. 1-3.

Example Methodological Implementation I

Figure 4:
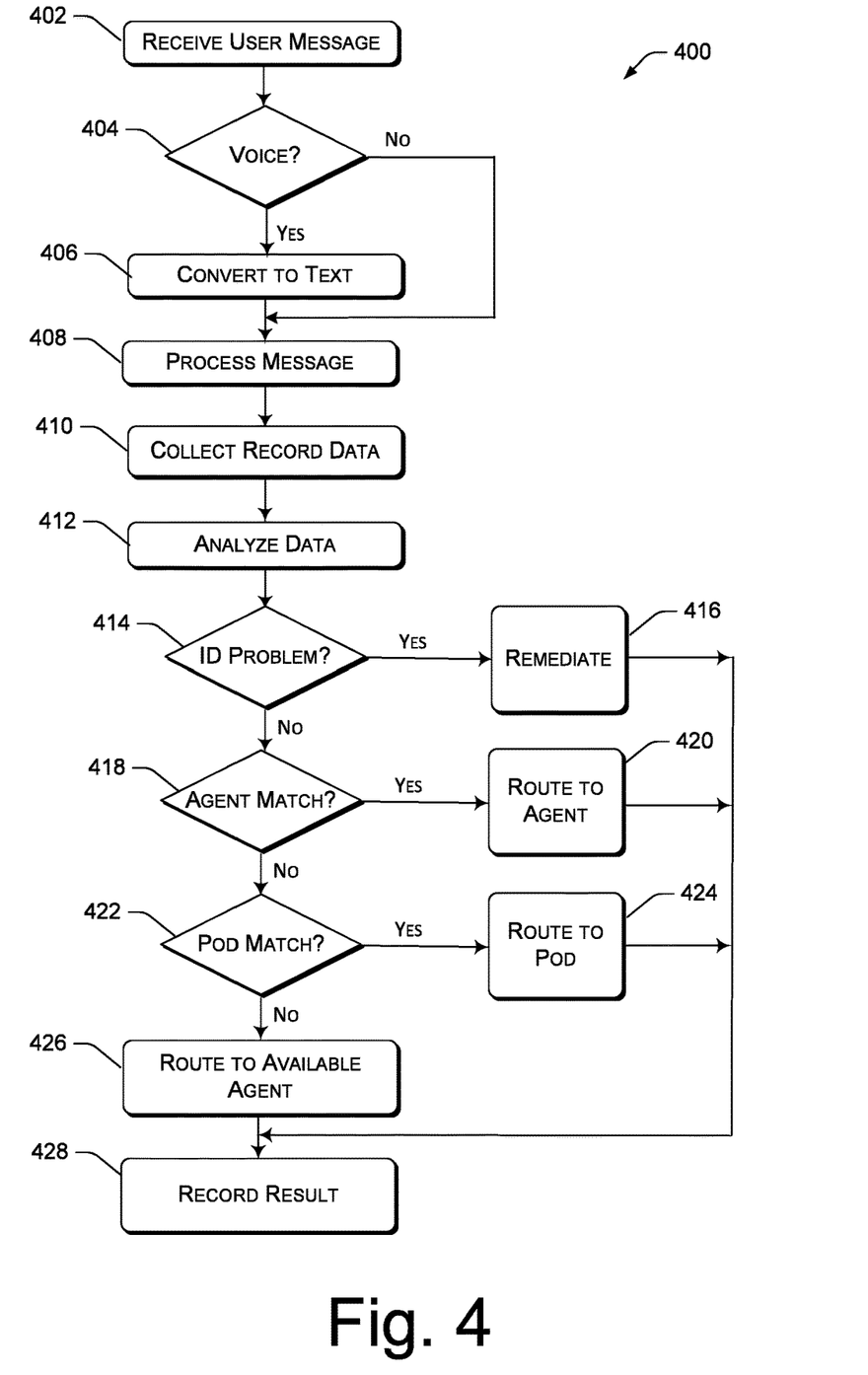
FIG. 4 is a flow diagram depicting a methodological implementation of using network device data to route a service call to a correct destination.

FIG. 4 is a flow diagram 400 depicting an example methodological implementation of using network device data to route a service call to a correct destination. The flow diagram 400 may be applied in context with the elements and reference numerals previously shown in FIGS. 1-3 and described with respect thereto. Continuing reference is made to FIGS. 1-3, below, with respect to FIG. 4. In the following discussion, certain operations may be attributed to one or more particular elements of a computing device (such as the server 300, FIG. 3). However, it is noted that any operations described below may be accomplished, in whole or partially, by one or more other elements in the server or other computing device.

At block 402, a user contact is received by the server 300 (FIG. 3). The contact is received through the communication interface 304 of the server 300 and, subsequently, via the user interface 316 of the support services component. The contact may be in one of several forms, such as a caller (i.e., device) identification message, a text-based message (e.g., e-mail, text message, etc.), or a voice message. If the contact is a voice message ("Yes" branch, block 404), then the message is converted from voice to text by the voice-to-text converter 318 at block 406. If the message is a user identification message (e.g., a phone number) or a text-based message ("No" branch, block 404), then the process skips the voice-to-text conversion of block 406.

The contact message is parsed by the parser 320 at block 408. The parser 320 identifies and extracts pre-defined key words from the contact message. A user identification message, or value, is also identified by the parser 320. If the message is a user identification message, then the parser 320 recognizes it as such and passes the user identification message to the data collector 322. The parser 320 then passes the identification message and the extracted keywords to the data collector 322 at block 410, where the data collector 322 collects data related to the contact message. As previously stated, the data collector 322 can be configured to retrieve any data within the cellular network 102 (FIG. 1), including data from the device associated with the user contact, other devices in the cellular network 102 such as devices in proximity to the device associated with the user contact, network data, history data associated with the user and/or device associated with the user contact, account data associated with the user and/or device associated with the user contact, etc. The data collector 322 identifies certain parameter values 333 from the collected data, and may store the parameter values 333 in the user data 332.

The data analyzer 350 obtains the stored parameter values 333 identified by the data collector 322, either directly or from the stored user data 332. At block 412, the data analyzer 350 compares the parameter values 333 from the collected user data 332 to parameter values in the issue parameters field 344 stored in the database 334. The data analyzer 350 creates a new record 338 and populates the fields for which it has data, particularly the parameter values 333, which are stored in the issue parameters field 344. The record number field 340 may be populated when the record 338 is created. At this point, however, no agent is involved, so the agent identifier field 342 cannot be populated. However, this information may be recorded later. Likewise, the resolution field 346 cannot be populated at this point, but will be populated as soon as a resolution is known or as soon as it can be determined that there is no resolution.

One thing that the data analyzer 350 can determine is whether the device data 324 or the network data 326 indicates that the contact subject relates to an issue that can be remediated remotely without human interaction. When the data analyzer 350 compares corresponding values in the parameter values 333 and the issue parameter fields 344 of the records 338, it can determine that a likely problem exists with the user device related to the contact because of similarities in the issue parameters field 344 of one or more records 338 that were present with previous user issues. If sufficient similarity exists between the parameter values 333 and the issue parameters field 344 of one or more records 338, then a resolution identified in the resolution field 346 for the records 338 of the previous contacts can be determined to be a proposed resolution that should be applied in the present case ("Yes" branch, block 414). If so, then the data analyzer 350 initiates the resolution at block 416, either by causing a message to be delivered to the user device associated with the contact, or by causing the diagnostics module 352 to apply the proposed resolution to the user device. A message delivered to the user device can convey one or more of several things. For one, the message may identify the proposed resolution and request permission from the user to apply the proposed resolution. For another, the message may inform the user that the proposed resolution will be (or has been) applied. For yet another, the message may inform the user to take certain steps to effect the proposed resolution.

As an example, the parameter values 333 may indicate that a messaging system on the user device (primary device) is malfunctioning, while user devices located near the user device (secondary devices) are functioning properly. The parameter values 333 may also indicate that when other users of similar devices in the same area had the same problem, it was necessary to download and install a fix for the messaging system. If so, then the proposed resolution would be to cause the fix to be downloaded and installed on the primary device.

If a particular problem or resolution cannot be identified ("No" branch, block 414), then the data analyzer 350 attempts to locate an appropriate agent to handle the contact at block 418. This can be done by comparing parameter values 333 to the issue parameters field 344 in the records 338 of the table 336 stored in the database 334. The data analyzer 350 finds the "best" match, i.e., a record 338 that matches the most values in the parameters values 333 and the issue parameters field 344. At this point, all records 338 that match a significant number of parameter values 333 may be designated as possible matches. What constitutes a significant number may be a pre-defined value. Also, a number of records 338 matching the pre-defined value may be limited to a second value, which may be pre-defined. But if multiple records 338 are designated as possible matches, they are ordered from the record having the most matching parameter values to the record having the least parameter values. Further analysis may then be performed on the ordered records.

Beginning with the "best" match, the data analyzer 350 reads the value in the agent identifier field 342. The agent identifier field 342 may indicate a number of properties related to an agent, which may be a human or an application. Such properties may include a name, an employee number, a telephone number, an email address, etc. In at least one implementation, the agent identifier field 342 may also include a real-time value that is continuously updated to indicate whether the identified agent is available, meaning not occupied or on duty but occupied. If an agent identified in the agent identifier field 342 of a record 338 is available ("Yes" branch, block 418), then the router 354 routes the contact to the identified agent at block 420.

If a suitable agent cannot be identified, or if an identified agent is not available ("No" branch, block 418), then the process continues at block 422, where the data analyzer 350 determines the most appropriate agent in the user support network 200 to whom the contact should be routed, based on a subject matter and/or a location of the contact. Determining the subject of the contact, such as whether the contact is related to a technical matter or to a non-technical matter, can be accomplished by analyzing collected user data 332. If the subject is technical, then the data analyzer 350 determines if the subject can be further defined as relating to an agent with specific skills, such as with an iPhone® 214, an Android® device 216, networks 218, signals 220, messaging 222, or some other particular skill 224. If the subject is non-technical, then the data analyzer 350 determines if the subject can be further defined as being related to an agent with specific skills in user accounts 226, finance 228, collections 230, of some other specific non-technical skill 232.

A contact location is also used to determine a location or pod to which to route the contact. The location of a suitable agent is important because agents in a particular geographic area are typically used to getting user contacts from users in that area. As a result, the agents are typically familiar with local conditions, such as terrain, weather, networks, and the like. Therefore, having this advantage may help a local agent resolve a user issue more quickly than one who does not have knowledge of such conditions.

If a suitable pod is found ("Yes" branch, block 422), then the router 354 routes the contact to the suitable pod (block 424). If no match is found ("No" branch, block 422), then the router 354 routes the contact to an available agent at block 426. At block 428, the routing determination is recorded by the recorder 356, together with the parameter values 333 previously collected.

Example Methodological Implementation II

Figure 5:
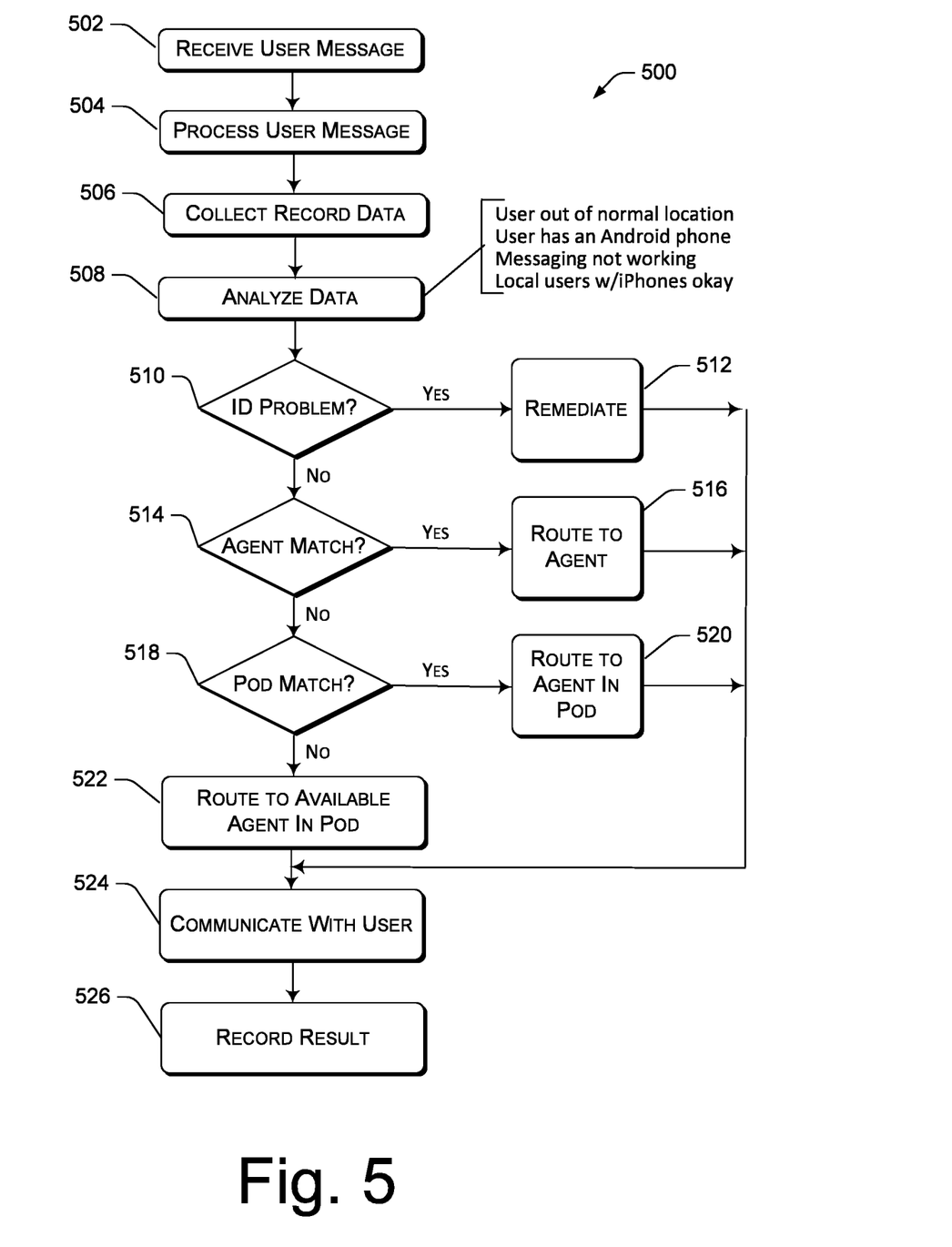
FIG. 5 is a flow diagram depicting a methodological implementation of an example case for the techniques described herein.

FIG. 5 is a flow diagram 500 depicting an example methodological implementation of an example case that uses network device data to route a service contact to a correct destination. The flow diagram 500 is similar to the flow diagram 400 depicted in FIG. 4, but is described relative to a particular user issue. Continuing reference is made to FIGS. 1-4, below, with respect to FIG. 5. In the following discussion, certain operations may be attributed to one or more particular elements of a computing device (such as the server 300, FIG. 3). However, it is noted that any operations described below may be accomplished, in whole or partially, by one or more other elements in the server or other computing device without departing from the scope of the description and claims.

At block 502, the communication interface 304 (FIG. 3), is contacted by a user device. The contact is passed to the user interface 316 of the support services component 314. In the present example, it is assumed that the user contact is in the form of a text-based message, such as an e-mail message, which is parsed at block 504 to extract key words from the message. Data is collected at block 506 by the data collector 322, and the data is stored in the issue parameters field 344 of the table 336 stored in the database 334. The collected data includes at least data retrieved from the user device 112(1) (FIG. 1) and from one or more secondary devices 112(2)-112(c). Data may also be collected from user account data 348 related to the use device 112(1), from network resources used by the user device (e.g. base station 106(1), etc., from a user device support issue history (from one or more records 338), etc. The collected data may also be stored as user data 332.

At block 508, the data analyzer 350 analyzes the collected data. In this particular example, the data analyzer 350 determines the following: (1) that the user is out of her normal location; that the user device is an Android® device, (3) that the SMS (Short Messaging Service) system is not operable on the user device; (4) that SMS systems on the secondary devices located near the user device are operable; and (5) that the secondary devices are iOS® devices. Using these parameters, the data analyzer 350 searches the issue parameters field 344 of the records 338 to find records 338 that indicate user issues that included the above-stated parameters. When such records are located, the data analyzer 350 uses information contained in the resolution field 346 of each matching record to determine how similar issues were previously resolved.

If a resolution indicates that a remote fix was applied to similar issues to resolve the issue ("Yes" branch, block 510), then the data analyzer 350 signals the diagnostics module 352 to initiates the identified remote fix. At block 512, the remote fix is applied. Thereafter, the support services component 314 communicates with the user at block 524 to inform the user that the remote fix was applied, to request permission from the user to apply the remote fix, to provide instructions to the user how to initiate or apply the fix, etc. Because the messaging system on the user device is not working, the communication is made by way of a communication method that does not utilize the messaging system, such as by e-mail or voice.

If the resolution field 346 does not indicate that an automated fix is available ("No" branch, block 510), then the data analyzer 350 may find a particular agent who was previously able to resolve a problem with similar parameter values. If so ("Yes" branch, block 514), then the contact is routed to that agent if the agent is available (block 516). It might be the case that multiple agents were identified as resolving a similar issue. In that case, if any of the multiple agents are available, the contact is routed to one of the available agents. If a suitable agent is on-duty but not currently available, the user contact may be routed to the agent to be put on hold until the agent becomes available.

If there is not an agent who is available ("No" branch, block 514), then the data analyzer attempts to locate the most suitable pod (e.g., Pod "A" 204, Pod "B" 206, etc.), based on the user device location and a subject of the contact (block 518). In the present example, the data analyzer 350 may determine that the subject of the contact is a technical subject and that the user device is an Android® device ("Yes" branch, block 518). In that case, the router 354 routes the contact to an agent with experience with Android® devices 216 in a pod 204, 206 that is responsible for user support in a geographic area in which the user is located (block 520). If such an identification cannot be made ("No" branch, block 518), then the router routes the contact to any available agent in a pod 204, 206 that has responsibility to cover the user's location (block 522).

The user is communicated with at block 524, either by a message informing the user that the user is being connected to an agent, that a remote fix has been performed, requesting permission to take an action on the user device, etc. The communication may be made by any available method, including voice, e-mail, SMS, etc. The results of the routing decision are recorded by the recorder 356 at block 526. Once a resolution has been applied, the recorder 356 records the resolution in a record 338 related to this instance of user contact.

Example Methodological Implementation III

Figure 6:
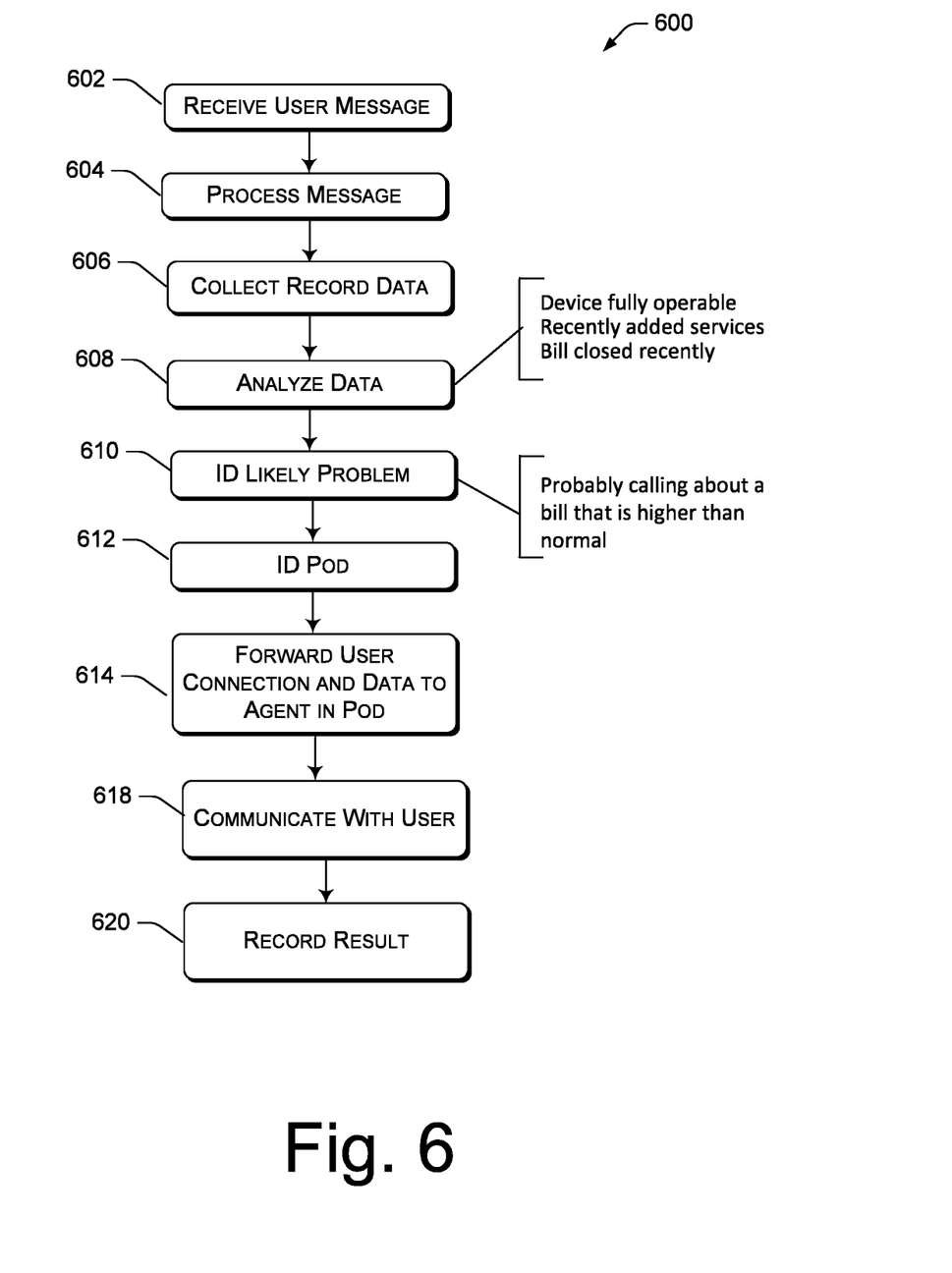
FIG. 6 is a flow diagram depicting a methodological implementation of an example case for the techniques described herein.

FIG. 6 is a flow diagram 600 depicting an example methodological implementation of an example case that uses network device data to route a service contact to a correct destination. Continuing reference is made to FIGS. 1-4, below, with respect to FIG. 6. In the following discussion, certain operations may be attributed to one or more particular elements of a computing device (such as the server 300, FIG. 3). However, it is noted that any operations described below may be accomplished, in whole or partially, by one or more other elements in the server or other computing device without departing from the scope of the description and claims.

At block 602, a user message is received via the user interface 316. The message is parsed at block 604, and at block 606, the data collector 322 collects user data 332 related to the user device (device data 324), devices located near the user device (device data 324), the network resources in use by the user device (network data 326), history data related to the user device (history data 328), account data related to the user device, etc. (account data 330). Key parameter values are extracted from the collected data and stored in user data 332.

At block 608, the data analyzer 350 analyzes the collected data and, in this example, learns that the user device is fully operable, the user recently added services to his account, and the user's first bill since adding the services was recently sent to the user. From this information, the data analyzer 350 can determine (block 610) that the likely subject of the user contact is an increase in the user's bill. The data analyzer 350 identifies an appropriate pod to which to route the contact at block 612. Here, the subject is determined to relate to a non-technical subject and to an accounts subject (billing). The user's location may also be determined. Therefore, the router 354 may route the contact to an agent that handles account matters 250 in a pod 206 located near the user (block 614). If a user history indicates that the user has spoken with a particular agent about the subject on previous occasions, a routing decision may be made to route the contact to that particular agent.

The agent to whom the contact was routed communicates with the user at block 618, and the recorder 356 stored the routing decision in a record 338 related to the current contact at block 620. Upon resolution of the issue, the resolution is stored in the resolution field 346 of the record 338 at block 620.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
receiving an incoming contact from an electronic device in communication with a distributed network;
identifying a user associated with the electronic device;
collecting data related to the user and the electronic device;
determining a likely subject of the incoming contact from the collected data;
determining whether the likely subject of the incoming contact is isolated to the electronic device or is common to one or more secondary devices that are proximate to the electronic device; and
connecting the electronic device to an appropriate network agent based on the likely subject of the incoming contact and whether the likely subject of the incoming contact is isolated to the electronic device or is common to the one or more secondary devices.

2. The method as recited in claim 1, further comprising:
identifying the one or more secondary devices that are proximate to the electronic device, based at least in part on the one or more secondary devices and the electronic device using a common base station.

3. The method as recited in claim 1, wherein the likely subject of the incoming contact relates to a technical subject, and
wherein, connecting the electronic device to the appropriate network agent further comprises connecting the electronic device to a technical network agent.

4. The method as recited in claim 1, further comprising:
determining a user location associated with the electronic device, based at least in part on the collected data, and
wherein, connecting the electronic device to the appropriate network agent further comprises connecting the electronic device to a network agent responsible for the user location.

5. The method as recited in claim 1, wherein the collected data further comprises at least two of the following data sets: a support history data of the user;
electronic device data; user account data; and network data.

6. The method as recited in claim 1, wherein the distributed network further comprises a cellular network.

7. The method as recited in claim 1, further comprising:
determining a user location associated with the electronic device, based at least in part on the collected data;

determining whether the likely subject of the incoming contact relates to a technical issue or to a business issue, wherein, connecting the electronic device to the appropriate network agent further comprises connecting the electronic device to a technical network agent that is responsible for technical issues arising in the user location in response to the incoming contact relating to the technical issue, and wherein, connecting the electronic device to the appropriate network agent further comprises connecting the electronic device to a business network agent that is responsible for business issues arising in the user location in response to the incoming contact relating to the business issue.

8. A system, comprising:

a network facilitating communications with multiple electronic devices;

multiple user support services pods, each pod including multiple user support agents trained to handle user support issues arising from use of a primary electronic device a secondary electronic device that uses a common base station with the primary electronic device;

a server, comprising:
- a communication interface configured to recognize an incoming communication from the primary electronic device;
- a data retriever configured to collect data from the primary electronic device and the secondary electronic device;
- a diagnostics module configured to determine a likely subject of the incoming communication from the collected data;
- the diagnostic module further configured to determine whether the likely subject of the incoming communication is isolated to the primary electronic device or is common to the secondary electronic device; and
- a router configured to connect the incoming communication with an appropriate network agent based on the likely subject and whether the likely subject of the incoming communication is isolated to the primary electronic device or is common the secondary electronic device.

9. The system as recited in claim 8, wherein:
the diagnosis module is further configured to determine a likely subject by comparing similar data from the primary electronic device and the secondary electronic device.

10. The system as recited in claim 8, wherein the data collected by the data retriever includes at least two sets of the following data sets: support history associated with the primary electronic device; primary electronic device data; account data associated with the primary electronic device; and network data of the network utilized by the primary electronic device.

11. The system as recited in claim 8, wherein the primary electronic device and the secondary electronic device further comprise cellular devices, and the network further comprises a cellular network.

12. The system as recited in claim 8, wherein:
each user support services pod includes technical user support agents and business user support agents;
the diagnostics module is further configured to determine if the likely subject is a technical matter or a business matter; and
the router is further configured to connect the incoming communication with a technical user support agent if the likely subject is a technical matter, and to connect the incoming communication with a business user support agent if the likely subject is a business matter.

13. The system as recited in claim 8, wherein the router is further configured to connect the incoming communication with a user support agent situated in a pod in a same location as the primary electronic device, the same location being based at least in part on the pod and the primary electronic device using a common base station.

14. The system as recited in claim 13, wherein a location of the primary electronic device is determined by a base station to which the primary electronic device is connected.

15. A method, comprising:
receiving a contact from a primary device;
collecting data from the primary device;
identifying one or more secondary devices that are proximate to located car the primary device based at least in part on the one or more secondary devices and the primary device sharing use of a common base station;
collecting data from the one or more secondary devices;
determining whether a likely subject of the contact is isolated to the primary device or is common to the one or more secondary devices, based at least in part on the data collected from the primary device and the one or more secondary devices;
determining an appropriate user support group to receive the contact from the primary device based at least in part on whether the likely subject of the contact is isolated to the primary device or is common to the one or more secondary devices; and
causing the contact from the primary device to be routed to the appropriate user support group.

16. The method as recited in claim 15, wherein determining whether the likely subject of the contact is isolated to the primary device or is common to the one or more secondary devices further comprises:
determining that a Short Messaging Service (SMS) messaging service is not operable on the primary device; and
determining that the SMS messaging service is operable on the one or more secondary devices.

17. The method as recited in claim 15, wherein:
the primary device is a cell phone and the one or more secondary devices are cell phones.

18. The method as recited in claim 15, further comprising:
determining that at least one secondary device of the one or more secondary devices is a same device type as the primary device; and
determining that the likely subject of the contact is common to the one or more secondary devices based at least in part on the at least one secondary device and the primary device being the same device type.

19. The method as recited in claim 15, further comprising:
determining that the one or more secondary devices are different device types to the primary device; and
determining that the likely subject of the contact is isolated to the primary device based at least in part on the one or more secondary devices and the primary device being different device types.

20. The method as recited in claim 15, further comprising:
determining whether the likely subject of the contact relates to a technical issue or a business issued, and
wherein, causing the contact from the primary device to be routed to the appropriate user support group further comprises causing the contact from the primary device to be routed to a technical support group if the likely subject of the contact relates to a technical issue or to a business support group if the likely subject of the contact relates to a business issue.

* * * * *